Patented Oct. 18, 1938

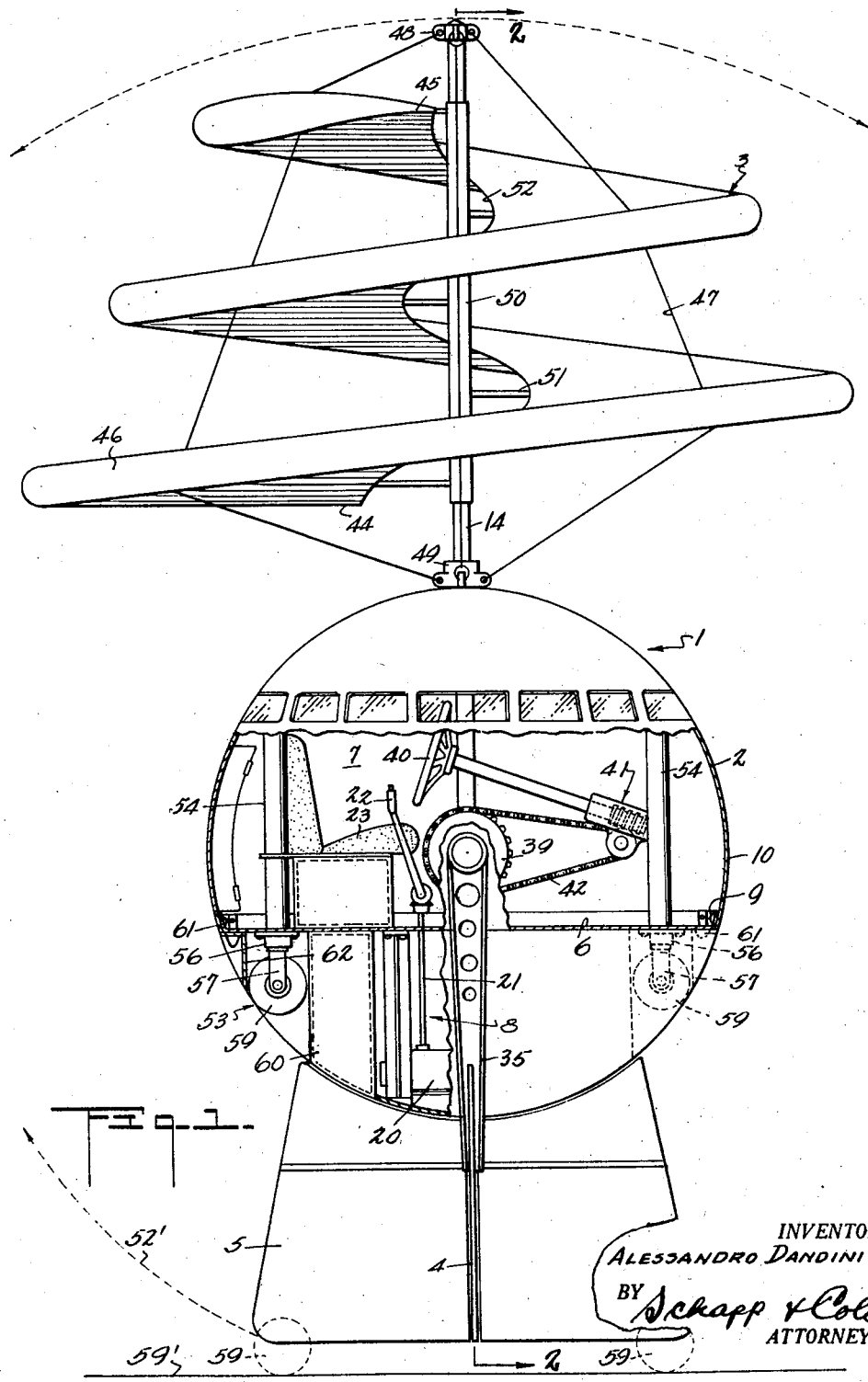

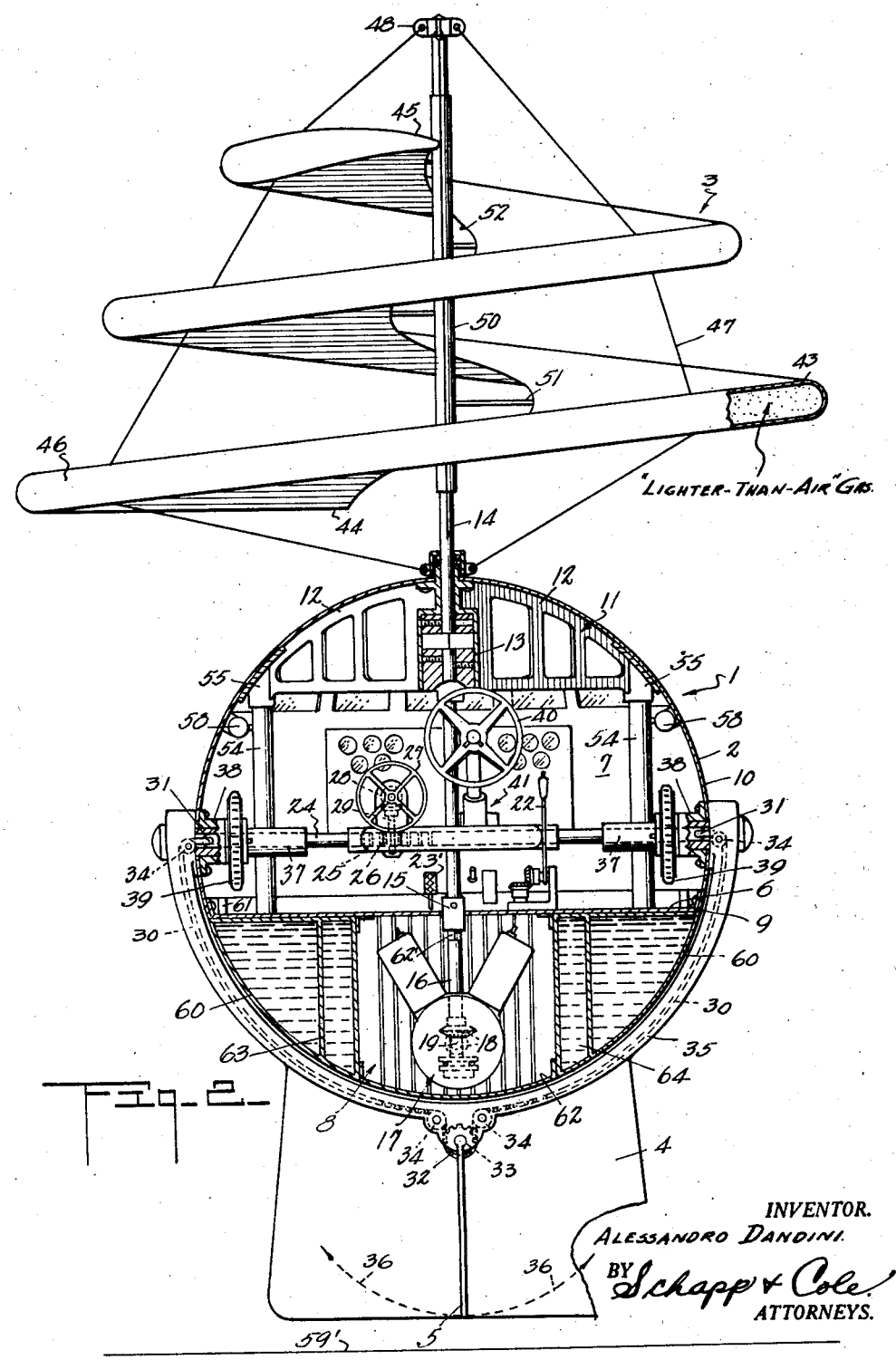

2,133,283

UNITED STATES PATENT OFFICE 2,133,283

AIRCRAFT

Alessandro Dandini, San Francisco, Calif.

Application December 18, 1936, Serial No. 116,544

8 Claims. (Cl. 244—87)

The present invention relates to improvements in aircraft and has particular reference to a flying machine of the helicopter type, the machine being sustained during flight by a spiral wing turning on a vertical axis. For this reason the craft is called the "Spiral-craft".

It is particularly proposed to provide a fuselage, preferably spherical-shaped in outline, which has a spiral wing mounted on the top thereof, and which makes use of novel means for controlling the direction of flight of the flying machine and the relative elevation thereof.

In my invention I propose to utilize a yoke-shaped member that is swingably mounted on the poles of the sphere, and which carries the elevator and rudder means exteriorly of the sphere. This yoke-shaped member is operable from a position within the sphere, and is swingable over the outer surface of the latter for controlling the ascension and descension of the fuselage and also the horizontal direction thereof.

As a further object of the invention, I propose to provide a novel retractable landing gear, that is normally concealed within the fuselage, and which may be extended into a position to support the entire machine above the surface of the ground.

Moreover, I propose to make use of a spiral wing that is provided with a chamber having lighter-than-air gas therein adapted to aid in sustaining the flying machine in the air. The spiral wing is relatively large in comparison with the fuselage, and the gas filled chamber preferably extends from one end of the spiral wing to the other.

Other objects and advantages of my invention will appear as the specification proceeds, and the novel features of my invention will be pointed out in the claims hereto attached.

For a better understanding of my invention, reference should be had to the accompanying drawings forming part of this application, in which Figure 1 is a side elevational view of the spiral-craft constructed in accordance with my invention, parts being broken away to disclose the interior of the craft; and Figure 2 a sectional view taken along line 2—2 of Figure 1, with parts in elevation.

While I have shown only the preferred form of my invention, it should be understood that various changes or modifications may be made within the scope of the claims hereto attached without departing from the spirit of the invention.

In carrying my invention into practice, I provide an aircraft indicated generally at 1, and including in its structural features a fuselage 2, preferably spherical-shaped, having a spiral wing 3 mounted thereabove, and an elevator 4 and a rudder 5 for directing the course of the craft during flight.

The fuselage is divided interiorly by means of a partition 6, into an operating chamber 7, and a power-plant compartment 8 arranged thereneath, the partition being made to serve as a floor for the operating chamber. Rivets 9 or other suitable means may be provided for fastening the partition to the wall 10 of the operating chamber.

It will be noted from Figure 2 that I provide a girder 11 in the upper section of the chamber 7, which is X-shaped in plan, and the arms 12 of the girder are welded or otherwise secured to the inner surface of the wall of the chamber. A central bearing 13 is provided in the girder for rotatably supporting a driven shaft 14, the latter having the spiral wing 3 secured to the upper end thereof.

The shaft 14 is provided at its lower end with a socket 15 adapted to be non-rotatably connected to a drive shaft 16 rising from the power-plant indicated generally at 17, the latter being located beneath the partition 6. Gearing 18 may be utilized for connecting the drive shaft 16 to the driven shaft 19 of the power-plant, and the transmission 20 (see Figure 1) of the power-plant may be controlled by a shifting mechanism 21 having an operating lever 22 arranged in the operating chamber.

The pilot, when in the seat 23, actuates the lever 22 so as to cause the spiral wing to rotate at the desired speed. A clutch, not shown, under control of the pedal 23' may be provided in the conventional manner for use when engaging the gears of the transmission 20 of the power-plant.

Referring now to Figure 2 I provide a horizontally disposed shaft 24, which extends transversely through the poles of the sphere. This shaft is formed intermediate of its ends with a rack 25, which is off-set sufficiently to clear the shaft 14, and a pinion 26 engages therewith. A hand-wheel 27 is operatively connected to the pinion 26 through bevel gearing 28 and a vertical shaft 29, the latter having the pinion 26 fixed thereto.

The shaft 24 is thus shifted axially upon turning the hand-wheel 27, and I utilize this movement for controlling the rudder 5. A flexible cable 30 is attached to the ends of the shaft 24, as at 31, and a chain section 32 is provided in the cable. The chain section engages with a sprocket 33 fixed to the rudder 5 in the manner illustrated.

The flexible cable and chain section are trained over pulleys 34 carried by a yoke 35, and upon moving the shaft 24 endwise, the cable 30 is acted upon and swings the rudder 5 as indicated by the arrows 36 to alter the course of the aircraft to the right or to the left during flight.

For controlling the ascension and descension of the craft, I provide the elevator 4, which is rigidly secured to the yoke 35 in the plane of the latter. The yoke is swingably mounted at the poles of the sphere by means of trunnions 37 fixed to the yoke and passing through bearings 38 in the wall 10 of the fuselage.

Swinging movement is imparted to the yoke 35 by means of sprockets 39, which are keyed or otherwise secured to the trunnions 37. A hand-wheel is provided at 40 for turning the sprockets 39 through a worm drive 41 and chains 42.

The trunnions 37 are made hollow for slidably accommodating the shaft 24, and that the cable 30 is guided along the length of the yoke 35. This construction permits the elevator to be raised or lowered by operating the hand-wheel 40, and at the same time the hand-wheel 27 can be turned for imparting a desired turning movement to the rudder 5 when it is desired to change the course of the aircraft.

The spiral 3 is preferably fashioned with a chamber 43 extending from one end of the spiral to the other. This chamber is filled with lighter-than-air gas for the purpose of aiding in the lifting of the aircraft.

I have shown the spiral as gradually decreasing in diameter from the lower end 44 to the upper end 45 thereof. It will be noted that the lower convolution 46 of the spiral is larger in diameter than the diameter of the spherical-shaped fuselage of the aircraft.

For bracing the several convolutions of the spiral 3, I provide guy wires 47, which are anchored to fittings 48 and 49 on the shaft 14. A tube 50 is telescoped over the shaft 14 and has a number of arms 51 extending radially therefrom, which in turn are fastened to the inner marginal portion 52 of the spiral.

The elevator 4 and rudder 5 are shown in the drawings as being swung into their lowermost positions beneath the fuselage 2. The elevator and rudder means may be swung about the poles of the sphere as indicated by the arrows 52'.

I provide a landing gear indicated generally at 53 adapted for supporting the aircraft sufficiently high above the ground to clear the bottom of the fuselage from the ground.

The landing gear comprises four cylinders 54 anchored to the girder 11 as at 55, (see Figure 2) and to the floor 6 of the operating chamber at 56 (see Figure 1). Within these cylinders I slidably mount telescoping pistons 57. These pistons are adapted to be projected from the cylinders by hydraulic means 58 to position wheels 59 on the underlying ground surface indicated at 59', to support the aircraft above the ground. Any other suitable means may be employed for moving the wheels 59 into extended position and I do not wish to be limited to hydraulic means.

In the event that the spiral-craft should meet adverse flying conditions requiring the power-plant 17 and the fuel tanks 60 to be dropped from beneath the fuselage for the purpose of safety and for reducing the weight of the craft, I provide releasable connecting means 61 between the floor 6 and a frame 62. The power-plant and the fuel tanks are carried by the frame 62. The connecting means 61 may be of any desired construction and are adapted to be released under control of the pilot of the spiral-craft.

It will be noted that the drive shaft 16 has a squared upper end 62' that may be disengaged from the socket 15 of the vertical shaft when the power plant is dropped from the fuselage.

As a further measure of safety, I have interposed a water tank 63 and an oil tank 64 between the fuel tanks 60 and the power-plant to prevent the fuel from becoming overheated.

From the foregoing description of the various parts of my spiral-craft, the operation thereof may be readily understood. The spiral 3 is set in motion, which results in lifting the entire spiral-craft from the ground. The lighter-than-air gas in the spiral aids in lifting the craft, and the latter is sustained by the lighter-than-air gas and by the rotation of the spiral.

The ascension and descension of the craft is regulated by swinging the elevator 4 about the axis of the horizontal shaft 24 upon actuating the hand-wheel 40, which results in tilting the shaft 14 with respect to the vertical. The course of the craft to the right and left is altered by operating the rudder 5 under control of the hand wheel 27.

In the event that it should be found necessary to drop the power-plant and the fuel tanks during flight, the elevator and the rudder means are first moved into an out-of-the-way position so as to permit the power-plant and the fuel tanks to be dropped from the spiral-craft.

I claim:

1. In an aircraft, a substantially spherical-shaped fuselage, a yoke supported on the fuselage for swinging movement about the poles of the sphere, an elevator fixed to the yoke, means for swinging the yoke to operate the elevator, a rudder mounted on the yoke and means extending along the yoke and through the poles of the sphere to actuate the rudder.

2. In an aircraft, a substantially spherical shaped fuselage, a yoke mounted on the exterior of the fuselage for swinging movement about the poles of the sphere, elevator and rudder means carried by the yoke, means for swinging the yoke, and means for actuating the rudder means.

3. In an aircraft, a spherical body, means for lifting and propelling the body, and a rudder and elevator assembly swingable about the horizontal poles of the body for resisting rotary motion of the body.

4. In an aircraft, a spherical body, means for lifting and propelling the body, and a rudder and elevator assembly swingable about the horizontal poles of the body for resisting rotary motion of the body, and means for swinging the assembly about said axis whereby resistance to rotary motion of the body is increased.

5. In an aircraft, a spherical body, means for lifting the body, and guide means for the craft swingable about the horizontal poles of the body.

6. In an aircraft, a spherical body and guide means for the craft swingable about the horizontal poles of the body, the body comprising an upper compartment and a lower compartment and separable fastening means for the latter permitting it to be dropped in mid-air when the guide means are swung about said poles to clear the dropping lower compartment.

7. In an aircraft, a spherical body and guide means swingable about a horizontal axis of the body, the guide means comprising a pair of alined bearings adjacent the shell of the body, a yoke movable over the outside of the body and having trunnions revolvable in the bearings, means for turning the trunnions for moving the yoke, an elevator blade fixed to the yoke, rudder blades pivoted in the yoke for swinging movement over the elevator blade, a shaft movable longitudinally in the trunnions and having a flexible connection with the rudder blades for swinging the latter when the shaft is moved, and means for imparting endwise motion to the shaft.

8. In an aircraft, a spherical body, a rotary lifting wing in the form of a spiral mounted thereon, the lifting wing having a section with an outer circumference larger than the diameter of the body, and a rudder and elevator assembly movable over the outer surface of the body and into a position diametrically opposite the spiral lifting wing.

ALESSANDRO DANDINI.